(12) United States Patent
Takahashi et al.

(10) Patent No.: US 6,510,881 B1
(45) Date of Patent: Jan. 28, 2003

(54) PNEUMATIC RADIAL TIRE AND METHOD OF MANUFACTURING THE SAME

(75) Inventors: Ken Takahashi, Hiratsuka (JP); Norio Ohmoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 147 days.

(21) Appl. No.: 09/593,811

(22) Filed: Jun. 15, 2000

(30) Foreign Application Priority Data

Jun. 17, 1999 (JP) .......................................... 11-170941

(51) Int. Cl.⁷ ......................... B60C 11/00; B29D 30/60
(52) U.S. Cl. ............................... 152/209.16; 152/209.1; 156/117; 156/130
(58) Field of Search ............................ 156/117, 130, 156/397; 152/209.12, 209.16, 209.1

(56) References Cited

U.S. PATENT DOCUMENTS 3,177,918 A * 4/1965 Holman ...................... 156/117

FOREIGN PATENT DOCUMENTS

| EP | 1020284 A2 * | 7/2000 |
| JP | 07251466 A * | 10/1995 |

* cited by examiner

*Primary Examiner*—Geoffrey L. Knable
(74) *Attorney, Agent, or Firm*—Rader, Fishman & Grauer PLLC

(57) ABSTRACT

A pneumatic radial tire having a tread formed from a rubber strip-stacked body by stacking rubber strip layers composed of a rubber strip wound spirally while continuously joining side surfaces thereof to each other in a tire circumferential direction on the outside of a carcass layer via a belt layer, in which boundary surfaces of the rubber strip of the rubber strip-stacked body forming at least an outermost layers of both shoulder portions of the tread are leaned respectively toward the outside of a tire diameter direction relative to a tire outside direction in a tire width direction.

1 Claim, 7 Drawing Sheets

PNEUMATIC RADIAL TIRE AND METHOD OF MANUFACTURING THE SAME

BACKGROUND OF THE INVENTION

The present invention relates to a pneumatic radial tire adapted to prevent separation on a tread and to eliminate a manufacturing defect in a vulcanizing process. Particularly, the present invention relates to a heavy load pneumatic radial tire such as an Off-the Road tire. The present invention also relates to a method of manufacturing such a pneumatic radial tire.

Conventionally, a tire such as the Off-the Road pneumatic radial tire, which is thick in a tread cross-section thereof, has had a tread rubber member which is thick, wide and long. Thus, a weight of the tread rubber member has been heavy. Moreover, an extruder for the tread rubber member has been limited in terms of equipment and operation. Accordingly, use of the tread rubber member extruded to a required shape has been difficult.

Therefore, a so-called Hot Strip Winding system as one of the tread-forming methods is employed. In this method, a belt-shaped rubber strip having a thickness of about 2 to 3 mm and a width ranging from about 40 to 100 mm is first extruded with the extruder. Next, the rubber strip is spirally wound in a tire circumferential direction while continuously joining side surfaces thereof to each other to form rubber strip layers. Moreover, these rubber strip layers are stacked for a plurality of times so as to have required thickness and shape. Thus, the tread is formed.

Accordingly, on the tread obtained by this method, as shown in FIG. 3, joining boundary lines of the rubber strip are left-side rising in a rubber strip layer $1_1$ which is a first layer counting from a carcass layer side to an outside direction of a tire diameter direction. In a second rubber strip layer $1_2$, the joining boundary lines are right-side rising; in a third rubber strip layer $1_3$, the lines are left-side rising; and in a fourth rubber strip layer $1_4$, the lines are right-side rising. Specifically, lean directions of the joining boundary lines of the rubber strip change alternately in the rubber strip layers. As a result, there remain the following problems ① to ③.

① For the Off-the Road pneumatic radial tire in which cut resistance performance is strongly demanded, an SBR-series compound is generally used as a tread rubber thereof. Herein, the SBR-series compound is a rubber composition composed of a styrene-butadiene copolymer rubber compounded with a compounding agent such as carbon black. However, adhesive strength between joining boundary surfaces of the rubber strip along joining boundary lines therebetween tends to be weak when the SBR-series compound is used. The reason of the above is as follows. Specifically, in the processes where the rubber strip is extruded, the tread is formed, and then the tread rubber is vulcanized, a part of the joining boundary surfaces of the rubber strip has already been vulcanized due to heat generated in the extrusion process. This leads to insufficient adhesion between the joining boundary surfaces of the rubber strip after the vulcanization process is finished. On the tread, a crack tends to occur along the joining boundary line, if adhesive strength between the joining boundary surfaces of the rubber strip is weak.

② During contact of the tire, the highest contact pressure is distributed in the region of the tread center. Next, a main deformation distribution in a cross section of a tire meridian direction inside the tread during the contact of the tire is viewed. Then, a deformation component in the tread center region is in a vertical direction since the tread center region is sandwiched among a belt layer and the tread rubbers of both shoulder portions. At this time, the deformation component crosses the joining boundary line of the rubber strip and exhibits a relatively low deformation level. On the other hand, since a side wall closer to the shoulder portion is in a free state, the deformation component leans toward a tire outside direction in the shoulder portion, leading to generation of a main deformation component F exhibiting a high deformation level. Accordingly, in the conventional tread-forming method shown in FIG. 3, the direction of this main deformation component F and the direction of the joining boundary line of the rubber strip become the same in any one of the both shoulder portions. In the shoulder portion where the foregoing two directions become the same, a crack is apt to occur along the joining boundary line, and the growth of the crack is apt to develop.

③ The tread is formed in such a manner that the rubber strip layers are stacked, in which the rubber strip is spirally wound in the tire circumferential direction while continuously joining the side surfaces thereof to each other. Accordingly, unevenness occurs on the tread surface before vulcanization as shown in FIG. 3. Consequently, vulcanization is performed in a state that rubber is not allowed to flow into concave portions because of air remaining therein. Thus, a product external appearance defect (light-tread defect), that a string-like line remains on the tread surface after vulcanization, is apt to occur.

SUMMARY OF THE INVENTION

The object of the present invention is to provide a pneumatic radial tire having a tread formed by the Hot Strip Winding system and a method of manufacturing the same, in which separation due to an occurrence of a crack on the tread is prevented, and a manufacturing defect (product external appearance defect) in a vulcanization process is eliminated.

In order to achieve the foregoing object, the present invention provides a pneumatic radial tire having a carcass layer laid between a pair of bead portions and a tread composed of a stacked body of a rubber strip wound continuously and spirally in a tire circumferential direction on the outside of the carcass layer via a belt layer, in which boundary surfaces of the rubber strip of the rubber strip-stacked body forming at least the outermost layers of the both shoulder portions of the tread are leaned respectively toward the outside of a tire diameter direction relative to a tire outside direction in a tire width direction.

The present invention also provides a method of manufacturing a pneumatic radial tire having a carcass layer laid between a pair of bead portions and a tread on the outside of the carcass layer via a belt layer, comprising the steps of forming the tread by stacking rubber strip layers composed of a rubber strip wound spirally in a tire circumferential direction while continuously joining side surfaces thereof to each other, and forming rubber strip layers forming at least the outermost layers of both shoulder portions by winding the rubber strip continuously and spirally from a tread shoulder end to a tread center direction in a tire circumferential direction, while leaning boundary surfaces of the rubber strip respectively toward the outside of a tire diameter direction relative to a tire outside direction in a tire width direction.

As described above, the boundary surfaces of the rubber strip on both the shoulder portions are leaned respectively toward the outside of the tire diameter direction relative to the tire outside direction in the tire width direction. Thus, these boundary surfaces (or joining boundary lines of the rubber strip) cross the direction of the main deformation component in the tread during contact of the tire. Accordingly, the direction of the main deformation component is not given along these boundary surfaces, thus preventing the occurrence and growth of the crack along these boundary surfaces. Consequently, even if mutual adhesion strength of the rubber strip is weak, separation on the tread can be prevented.

Moreover, in the cross section of the tire meridian direction, movement of the tread rubber during vulcanization is the largest on the shoulder portions, and vulcanization is performed in such a manner that the tread rubber flows from the tread center region into the shoulder portions. Particularly, the product external appearance defect on the shoulder portions of the tread surface is as follows.

(a) The boundary surfaces of the rubber strip of the rubber strip-stacked body forming at least the outermost rubber strip layers are leaned respectively toward the outside of the tire diameter direction relative to the tire outside direction of the tire width direction, thus creating the uneven surface. On the uneven surface, the flow of the tread rubber from the tread center region to the shoulder portion during vulcanization becomes gentle, and the flow thereof is not in a disorder. Accordingly, the product external appearance defect does not occur.

(b) On the contrary to the above, the boundary surfaces of the rubber strip of the rubber strip-stacked body forming at least the outermost rubber strip layers are leaned respectively toward the inside of the tire diameter direction relative to the tire outside direction of the tire width direction, thus creating the uneven surface. On the uneven surface, the flow of the tread rubber from the tread center region to the shoulder portion during vulcanization becomes rapid, and the flow thereof is in a disorder. Specifically, the flow of the rubber shows an aspect as if the rubber strip were nappy. Accordingly, the product external appearance defect is apt to occur.

In the present invention, as described above, the boundary surfaces of the rubber strip are leaned toward the outside of the tire diameter direction relative to the tire outside direction of the tire width direction in the both shoulder portions. Thus, the product external appearance defect can be eliminated.

BRIEF DESCRIPTION OF THE DRAWING

For a more complete understanding of the present invention and the advantages thereof, reference is now made to the following description taken in conjunction with the accompanying drawings, in which.

DESCRIPTION OF THE PREFERRED EMBODIMENTS

Figure 1:
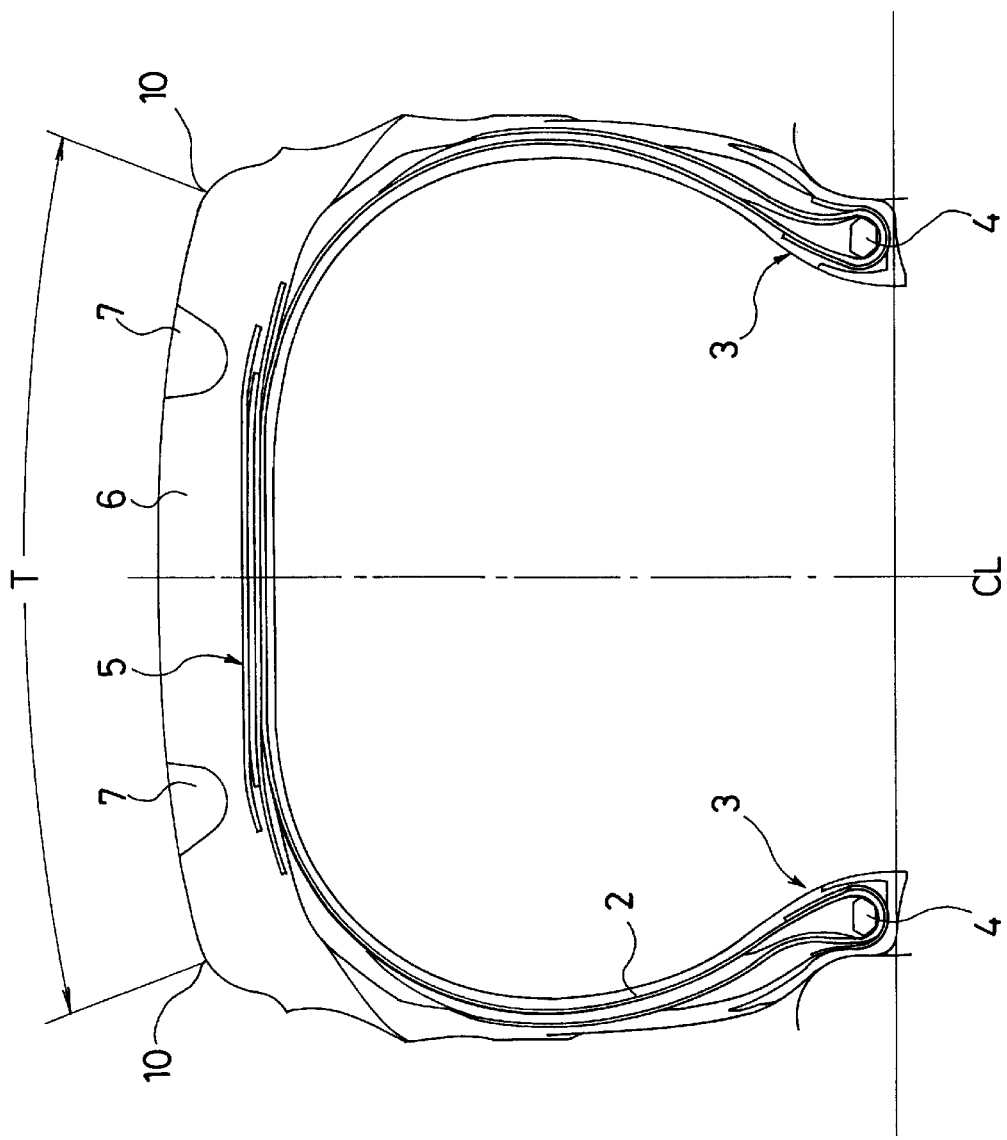
FIG. 1 is a cross-sectional explanatory view of an example of the heavy load pneumatic radial tire along the meridian direction according to the present invention.

In the heavy load pneumatic radial tire according to the present invention, as shown in FIG. 1, the carcass layer 2 is laid between a pair of the bead portions 3 and 3. And an end portion of the carcass layer 2 is folded back and wound up around the bead core 4 of the bead portion 3 from the inside of the tire to the outside thereof. Moreover, on the outside of the carcass layer 2, the belt layer 5 having a plurality of belts is disposed around the whole circumference of the tire. On the outside of the belt layer 5, the tread 6 is arranged around the whole circumference of the tire. On a surface of the tread 6, that is, on the tread surface, the main groove 7 is arranged around the whole circumference of the tire.

Figure 2:
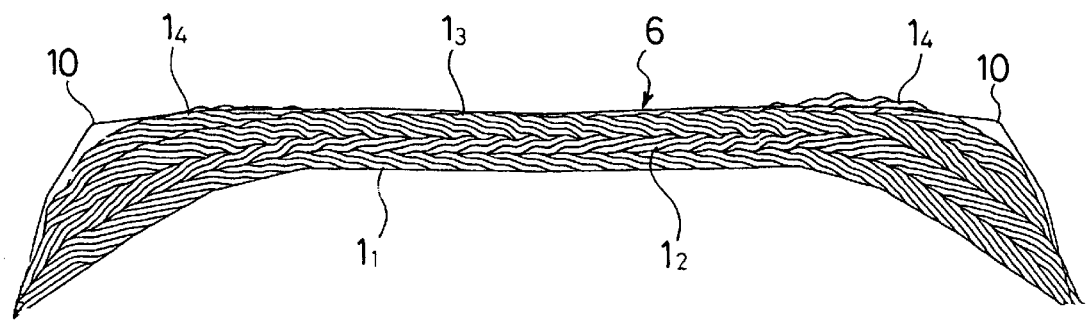
FIG. 2 is a cross-sectional explanatory view showing an example of the state of forming the tread on the heavy load pneumatic radial tire along the meridian direction according to the present invention.
Figure 3:
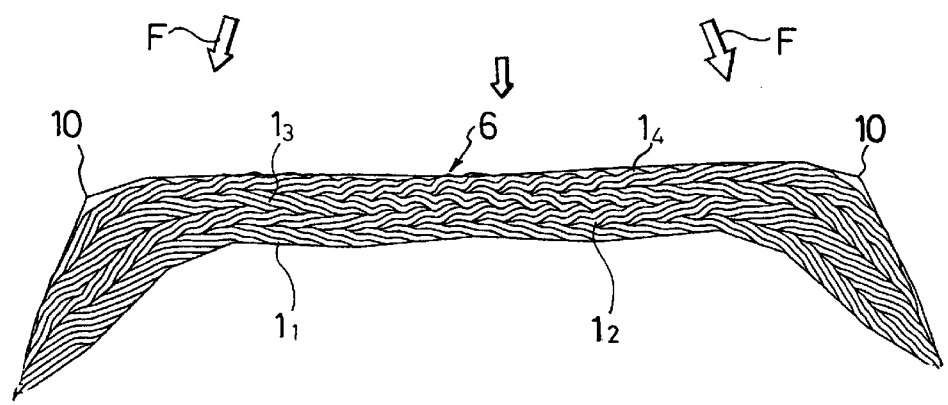
FIG. 3 is a cross-sectional explanatory view showing an example of the state of forming the tread on the conventional heavy load pneumatic radial tire along the meridian direction.

In the present invention, the tread 6 is formed from the rubber strip-stacked body in such a manner that the rubber strip layers are stacked, in which the rubber strip is spirally wound in the tire circumferential direction while continuously joining the side surfaces thereof to each other. Moreover, at least the boundary surfaces of the rubber strip of the rubber strip-stacked body forming the outermost rubber strip layers of the both shoulder portions are leaned respectively toward the outside of the tire diameter direction relative to the tire outside direction of the tire width direction. Specifically, as shown in FIG. 2, the tread 6 is formed from the rubber strip layers $1_1$, $1_2$, $1_3$ and $1_4$ composed of the rubber strip wound spirally in the tire circumferential direction while continuously joining the side surfaces thereof to each other. And, the joining boundary lines of the rubber strip (or the joining boundary surfaces of the rubber strip) are left-side rising in the rubber strip layer $1_1$ which is the first layer counting from the carcass layer side to the outside direction of the tire diameter direction. In the second rubber strip layer $1_2$, the joining boundary lines are right-side rising; and in the third rubber strip layer $1_3$, the lines are left-side rising. And, in the fourth rubber strip layers $1_4$ and $1_4$ forming both the shoulder portions of the tread surface, the joining boundary lines of the rubber strip closer to both the tread shoulder ends 10 and 10 (i.e., contact ends of the tire width direction) are leaned toward the outside of the tire diameter direction. Specifically, in FIG. 2, in the rubber strip layer $1_4$ forming the right shoulder portion, the joining boundary line is right-side rising. On the other hand, in the rubber strip layer $1_4$ forming the left shoulder portion, the joining boundary line is left-side rising. Therefore, as shown in FIG. 2, the side surfaces of the rubber strip are joined to each other so that the joining boundary surfaces of the rubber strip in both the shoulder portions in the cross section along the meridian direction can form a V-shape.

Figure 4:
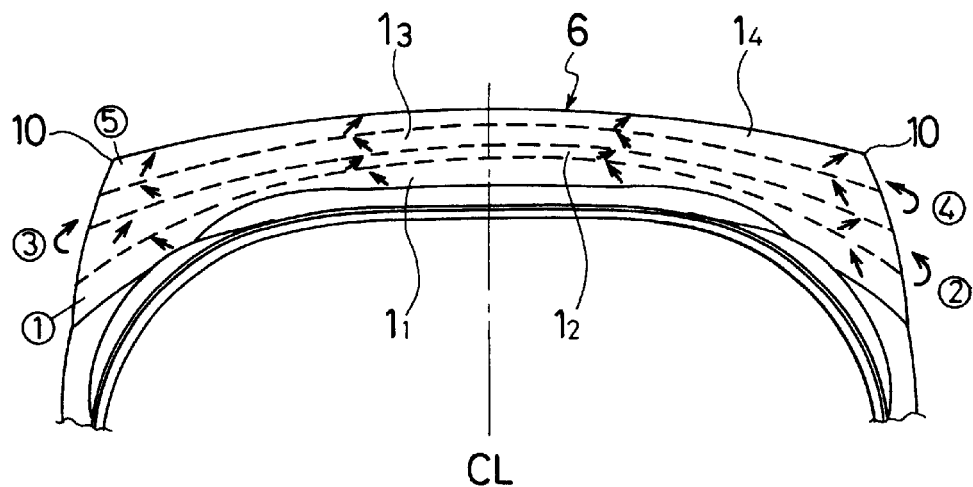
FIG. 4 is a cross-sectional explanatory view showing an example of the steps of forming the tread on the conventional heavy load pneumatic radial tire along the meridian direction.

In forming the tread 6 by stacking the rubber strip layers, conventionally, as shown in FIG. 4, the rubber strip is spirally wound from the position ① toward the position ② in the tire circumferential direction while leaning the joining boundary lines to the arrow direction and continuously joining the side surfaces thereof to each other to form the rubber strip layer $1_1$. Next, the rubber strip is reversed to the outside of the rubber strip layer $1_1$ at the position ②. And, in the same manner as described above, the rubber strip is spirally wound from the position ② toward the position ③ while leaning the joining boundary lines to the arrow direction to form the rubber strip layer $1_2$. Moreover, the rubber strip is reversed to the outside of the rubber strip layer $1_2$ at the position ③. And, in the same manner as described above, the rubber strip is spirally wound from the position ③ toward the position ④ while leaning the joining boundary lines to the arrow direction to form the rubber strip layer $1_3$. Furthermore, the rubber strip is reversed to the outside of the rubber strip layer $1_3$ at the position ④. And, in the same manner as described above, the rubber strip is spirally wound from the position ④ toward the position ⑤ while leaning the joining boundary lines to the arrow direction to form the rubber strip layer $1_4$.

Figure 5:
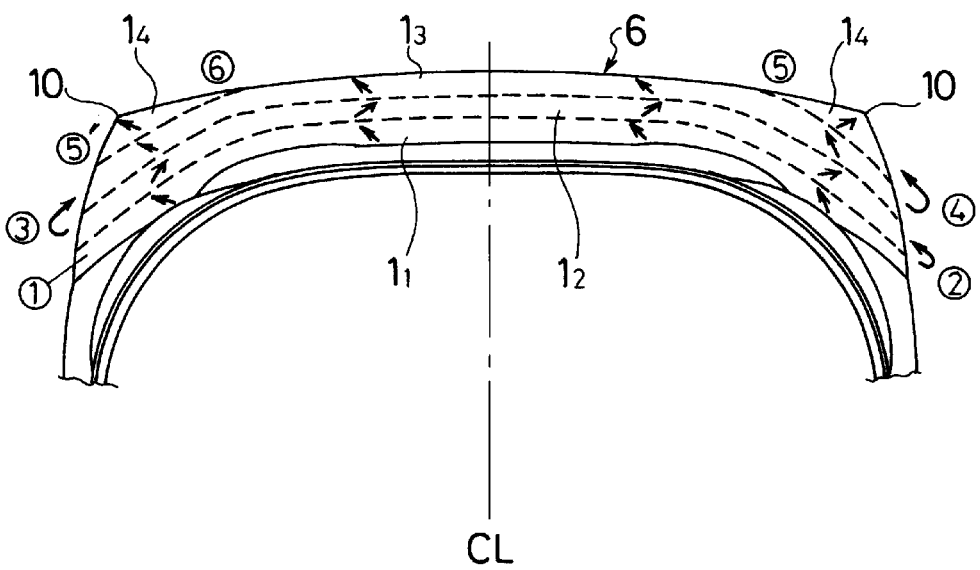
FIG. 5 is a cross-sectional explanatory view showing an example of the steps of forming the tread on the heavy load pneumatic radial tire along the meridian direction according to the present invention.

On the other hand, in the present invention, also as shown in FIG. 5, the rubber strip layers $1_1$ to $1_3$ are formed in the same manner as shown in FIG. 4. However, the rubber strip is reversed to the outside of the rubber strip layer $1_3$ at the position ④. And, in the same manner as above, the rubber strip is spirally wound from the position ④ toward the position ⑤ while leaning the joining boundary lines to the arrow direction (that is, while leaning the joining boundary lines closer to the tread shoulder end 10 toward the outside of the tire diameter direction). Thus, the rubber strip layer $1_4$ constituting the right shoulder portion is formed. Furthermore, in the same manner as above, the rubber strip is spirally wound from the position ⑤' toward the position ⑥ while leaning the joining boundary lines to the arrow direction (that is, while leaning the joining boundary lines closer to the tread shoulder end 10 toward the outside of the tire diameter direction). Thus, the rubber strip layer $1_4$ constituting the left shoulder portion is formed. As described above, the tread 6 of the present invention is formed.

Figure 6:
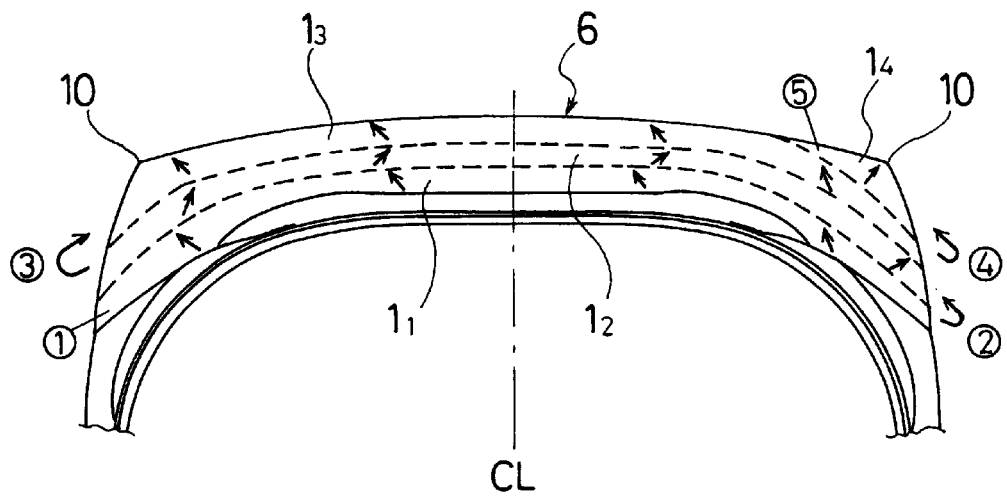
FIG. 6 is a cross-sectional explanatory view showing another example of the step of forming the tread on the heavy load pneumatic radial tire along the meridian direction according to the present invention.

FIG. 6 shows another example of forming the tread 6 according to the present invention. In FIG. 6, the rubber strip layer $1_3$ also serves as one of the shoulder portions. And, in the same manner as above, the rubber strip is spirally wound from the position ④ toward the position ⑤ while leaning the joining boundary lines to the arrow direction (that is, while leaning the joining boundary lines closer to the tread shoulder end 10 toward the outside of the tire diameter direction). Thus, the rubber strip layer $1_4$ constituting the other shoulder portion is formed.

Herein, the region is defined where the boundary surfaces of the rubber strip of the rubber strip-stacked body are leaned toward the outside of the tire diameter direction relative to the tire outside direction of the tire width direction. At this time, in the outermost layer of the shoulder portion, the region should be at least from the position of 10% to the position of less than 25% of a tread development width T from the tread shoulder end 10 to the inside of the tire width direction. This is because the main deformation component F occurs mainly in this region. The tread development width T stands for a tire contact width under a maximum load air pressure and a load condition corresponding thereto, described in the JATMA YEAR BOOK 1998.

Figure 7:
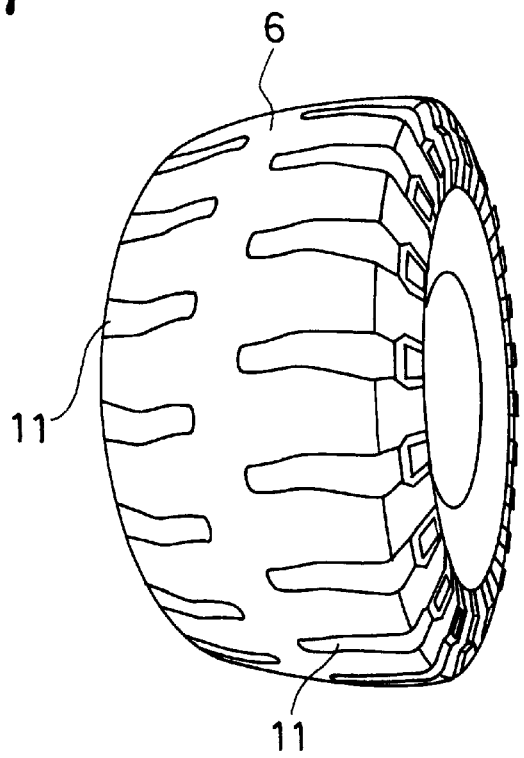
FIG. 7 is a perspective view showing an example of a tread pattern formed on the tread surface of the heavy load pneumatic radial tire according to the present invention.

Moreover, in the present invention, as shown in FIG. 7, the lug grooves 11 extending to the tire width direction may be provided on the surface of the tread 6 to form a lug pattern. Furthermore, as shown in FIG. 8, a plurality of the main grooves 7 extending to the tire circumferential direction may be provided on the surface of the tread 6 to divide the surface of the tread 6 into a plurality of the blocks 12, thus forming a block pattern.

Figure 9:
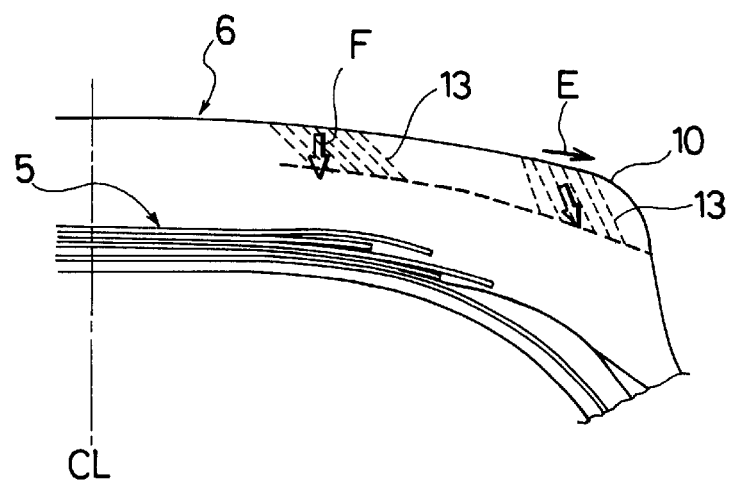
FIG. 9 is a semi-cross-sectional explanatory view showing an example of the direction of the main deformation component F due to a contact reaction in the tread during contact and the direction of the joining boundary lines of the rubber strip of the rubber strip layers along the meridian direction.

One case where the lug pattern as shown in FIG. 7 is formed will be described below. As shown in FIG. 9, in the shoulder portion of the tread surface, the joining boundary line 13 of the rubber strip of the rubber strip layer, which is closer to the tread shoulder end 10, is leaned toward the inside of the tire diameter direction. At this time, the direction of the main deformation component F due to the contact reaction during the contact and the direction of the joining boundary line 13 become the same. Thus, a crack is apt to occur on the shoulder portion, and the growth of the crack is apt to develop. Furthermore, in the vulcanization process, the flow of the rubber on the surface of the rubber strip layer in the shoulder portion is in the direction such that the lean of the rubber strip winding is erected (The arrow E shows the direction of rubber flowing during vulcanization). With such structure, air tends to remain in the concave portions on the surface of the rubber strip layer, leading to the product external appearance defect.

Figure 10:
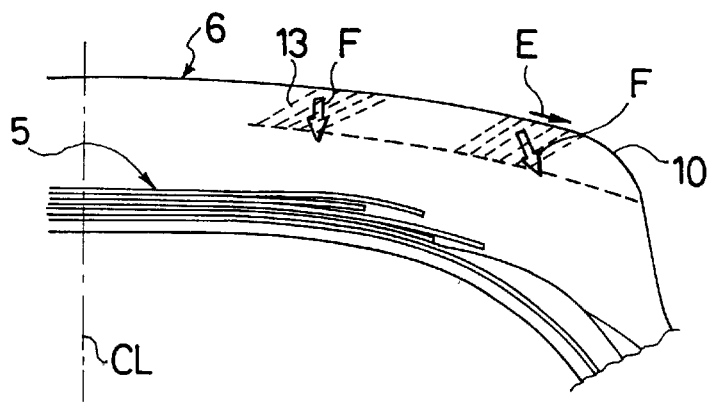
FIG. 10 is a semi-cross-sectional explanatory view showing another example of the direction of the main deformation component F due to the contact reaction in the tread during the contact and the direction of the joining boundary lines of the rubber strip of the rubber strip layers along the meridian direction.

Another case where the lug pattern as shown in FIG. 7 is formed will be described below. As shown in FIG. 10, the joining boundary line 13 of the rubber strip of the rubber strip layer forming the outermost layer of the shoulder portion of the tread surface, which is closer to the tread shoulder end 10, is leaned toward the outside of the tire diameter direction. In other words, the joining boundary surface of the rubber strip of the rubber strip-stacked body forming the outermost layer of the shoulder portion is leaned toward the outside of the tire diameter direction relative to the tire outside direction of the tire width direction. With such structure, the direction of the main deformation component F and the direction of the joining boundary line 13 cross to each other. Thus, the crack is hard to occur on the shoulder portion. Moreover, even if the shoulder portion is damaged with a cut, the growth of the crack is stopped. Furthermore, the lean of the rubber strip winding is along the direction of the rubber flowing on the surface of the rubber strip layer of the shoulder portion in the vulcanization process. Accordingly, the flow of the rubber becomes smooth (The arrow E shows the direction of the rubber flowing during vulcanization). Thus, the product external appearance defect is hard to occur.

Figure 8:
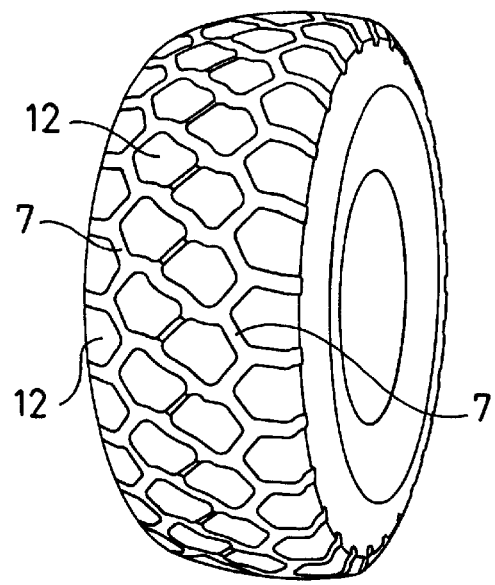
FIG. 8 is a perspective view showing another example of the tread pattern formed on the tread surface of the heavy load pneumatic radial tire according to the present invention.

The case where the block pattern as shown in FIG. 8 is formed will be described below. In this case, the outermost regions from a pair of the main grooves 7 and 7 of the outermost side of the tire width direction to the corresponding tread shoulder ends are defined. In each of the outermost regions, the joining boundary surface of the rubber strip of the rubber strip-stacked body should be leaned to the outside of the tire diameter direction relative to the tire outside direction of the tire width direction, at least in the groove wall portion of the main groove, which is closer to the tread shoulder end. Alternatively, in each of the outermost region from the main grooves 7 and 7 to the tread center, the joining boundary surface of the rubber strip of the rubber strip-stacked body should be leaned to the inside of the tire diameter direction relative to the tire outside direction of the tire width direction, at least in the groove wall portion of the main groove, which is closer to the tread center. In other words, the groove center in the tire width direction of the main groove 7 of the outermost side of the tire width direction is defined as a boundary. And, in the region closer to the tread shoulder end than the foregoing boundary, the joining boundary line of the rubber strip of the outermost rubber strip layer, which is closer to the tread shoulder end, should be leaned to the outside of the tire diameter direction, at least in the groove wall portion of the main groove, which is closer to the tread shoulder end. Alternatively, in the region closer to the tread center than the foregoing boundary, the joining boundary line of the rubber strip of the outermost rubber strip layer should be leaned to the inside of the tire diameter direction, at least in the groove wall portion of the main groove, which is closer to the tread center.

Figure 11:
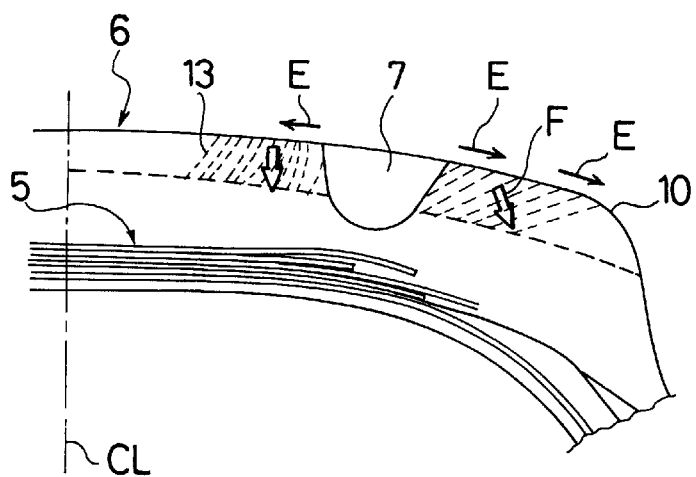
FIG. 11 is a semi-cross-sectional explanatory view showing an example of the direction of the main deformation component F due to the contact reaction in the tread during the contact and the direction of the joining boundary lines of the rubber strip of the rubber strip layers along the meridian direction in the case of providing a main groove extending to the tire circumferential direction on the tread surface.
Figure 12:
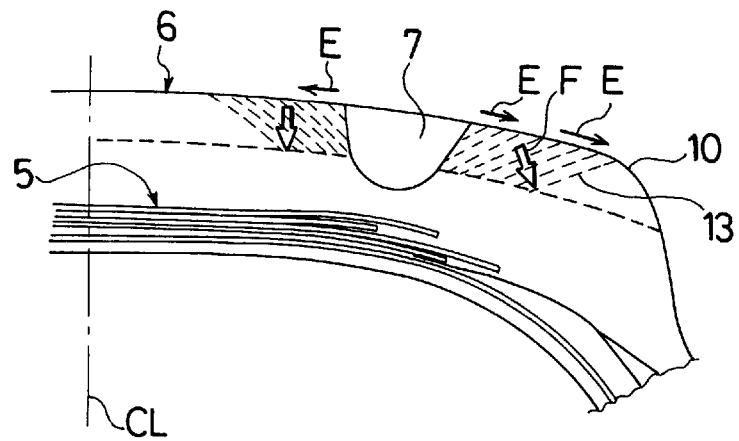
FIG. 12 is a semi-cross-sectional explanatory view showing another example of the direction of the main deformation component F due to the contact reaction in the tread during the contact and the direction of the joining boundary lines of the rubber strip of the rubber strip layers along the meridian direction in the case of providing the main groove extending to the tire circumferential direction on the tread surface.

Specifically, the joining boundary line 13 of the rubber strip of the outermost rubber strip layer closer to the tread shoulder end 10 is leaned toward the outside of the tire diameter direction. Then, the rubber strip layer of the tread surface is pushed apart by a protrusion of an inner surface of a metallic mold corresponding to the closest main groove 7 to the tread shoulder end when a green tire is put in the metallic mold and the mold is closed for vulcanizing the tire. Accordingly, as shown in FIG. 11, the joining boundary line 13 in the side of the main groove 7 closer to the tread center CL is erected. As a result, particularly at the point of about 25% of the tread development width from the tread shoulder end toward the tread center CL, the direction of the main deformation component F and the direction of the joining boundary line 13 become the same. Accordingly, a crack is apt to occur and grow. Furthermore, the direction of the rubber flowing on the surface of the rubber strip layer of the shoulder portion in the vulcanization process is that of erecting the lean of the rubber strip winding (The arrow E shows the direction of the rubber flowing during vulcanization). Accordingly, air tends to remain in the concave portions on the surface of the rubber strip layer, leading to the product external appearance defect. Incidentally, as shown in FIG. 12, the groove center in the tire width direction of the main groove 7 of the outermost side of the tire width direction is defined as the boundary, and the following is performed. Specifically, in the region closer to the tread shoulder end 10 than the foregoing boundary, the joining boundary line 13 closer to the tread shoulder end 10 is leaned to the outside of the tire diameter direction. Alternatively, in the region closer to the tread center CL than the foregoing boundary, the joining boundary line 13 is leaned to the inside of the tire diameter direction. Then, the rubber strip layer of the tread surface is pushed apart by the protrusion of the inner surface of the metallic mold when the metallic mold is closed as described above. In this case, however, the lean of the rubber strip winding is along the direction of the rubber flowing on the surface of the rubber strip layer in the vulcanization process. Accordingly, the flow of the rubber becomes smooth (The arrow E shows the direction of the rubber flowing during vulcanization). Thus, the product external appearance defect is hard to occur. Moreover, the side surfaces of the rubber strip are joined to each other so that, in the cross section along the meridian direction, the joining boundary surfaces of the rubber strip in both the sides can form a V-shape when the main groove 7 is a boundary. Thus, the joining boundary line 13 is leaned so that a cross-angle thereof relative to the main deformation component F can become large. The tread surface thus constituted is advantageous to the occurrence and growth of a crack.

Figure 13:
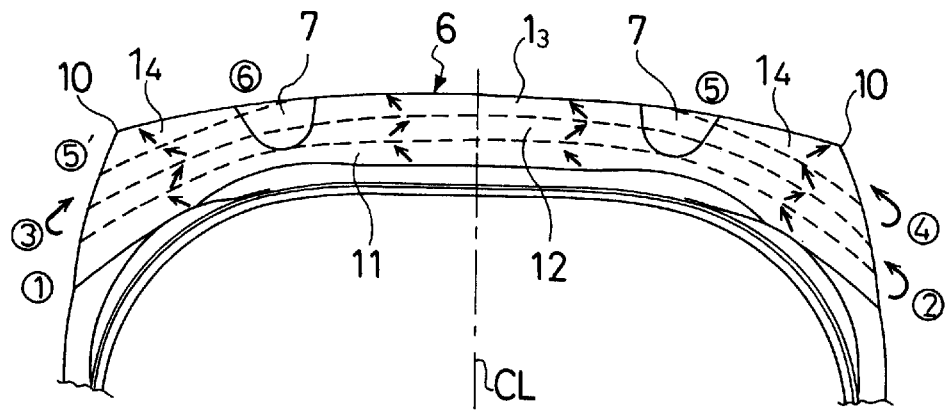
FIG. 13 is a cross-sectional explanatory view showing an example of the steps of forming the tread along the meridian direction in the case of providing the main groove extending to the tire circumferential direction on the tread surface.

Accordingly, a problem similar to that in FIG. 11 will occur when the rubber strip layer $1_4$ constituting the left shoulder portion is formed as shown in FIG. 13 in the following manner. Specifically, the rubber strip layers $1_1$ to $1_3$ are formed in the same manner as shown in FIG. 4. And, the rubber strip is reversed to the outside of the rubber strip layer $1_3$ at the position ④. And, in the same manner as above, the rubber strip is spirally wound from the position ④ toward the position ⑤ while leaning the joining boundary lines to the arrow direction (that is, while leaning the joining boundary lines closer to the tread shoulder end 10 toward the outside of the tire diameter direction). Moreover, in the same manner as above, the rubber strip is spirally wound from the position ⑤' toward the position ⑥ while leaning the joining boundary lines to the arrow direction (that is, while leaning the joining boundary lines closer to the tread shoulder end 10 toward the outside of the tire diameter direction). Thus, the rubber strip layer $1_4$ constituting the left shoulder portion is formed. With such structure, the foregoing problem will occur since, in the left side of the tread center CL, the joining boundary lines of the rubber strip of the rubber strip layers $1_3$ and $1_4$ forming the tread surface are leaned to the same direction. Specifically, the joining boundary lines of the both sides of the main groove 7 are leaned to the same direction.

Figure 14:
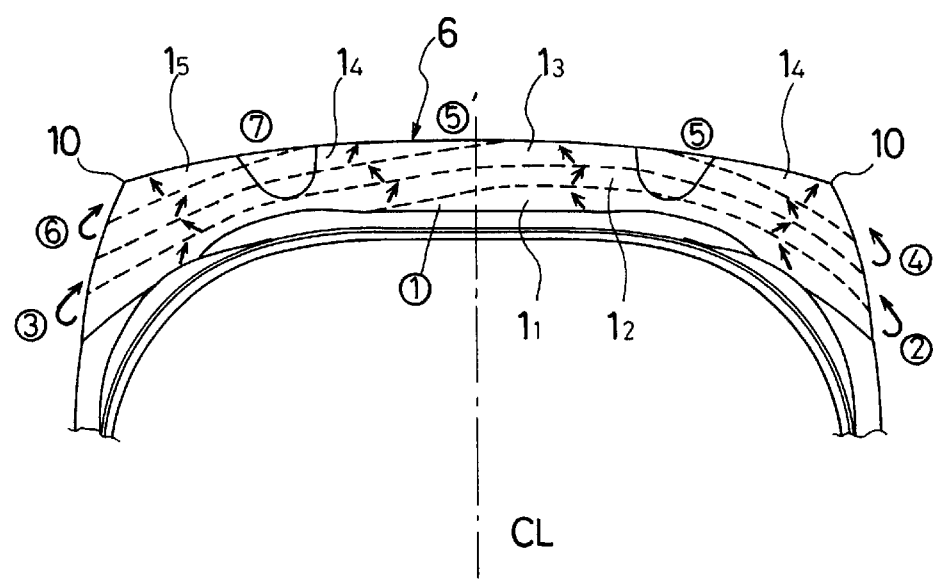
FIG. 14 is a cross-sectional explanatory view showing another example of the steps of forming the tread along the meridian direction in the case of providing the main groove extending to the tire circumferential direction on the tread surface.

On the contrary to the above, the rubber strip layer 15 is formed as shown in FIG. 14 in the following manner. Specifically, the rubber strip is spirally wound from the position ① toward the position ② in the tire circumferential direction while leaning the joining boundary lines to the arrow direction and continuously joining the side surfaces thereof to each other to form the rubber strip layer $1_1$. Next, the rubber strip is reversed to the outside of the rubber strip layer $1_1$ at the position ②. And, in the same manner as described above, the rubber strip is spirally wound from the position ② toward the position ③ while leaning the joining boundary lines to the arrow direction to form the rubber strip layer $1_2$. Moreover, the rubber strip is reversed to the outside of the rubber strip layer $1_2$ at the position ③. And, in the same manner as described above, the rubber strip is spirally wound from the position ③ toward the position ④ while leaning the joining boundary lines to the arrow direction to form the rubber strip layer $1_3$. Furthermore, the rubber strip is reversed to the outside of the rubber strip layer $1_3$ at the position ④. And, in the same manner as described above, the rubber strip is spirally wound from the position ④ toward the position ⑤ while leaning the joining boundary lines to the arrow direction to form the rubber strip layer $1_4$. Next, in the same manner as described above, the rubber strip is spirally wound from the position ⑤' toward the position ⑥ while leaning the joining boundary lines to the arrow direction to form the rubber strip layer $1_4$. Still further, the rubber strip is reversed to the outside of the rubber strip layer $1_4$ at the position ⑥. And, in the same manner as described above, the rubber strip is spirally wound from the position ⑥ toward the position ⑦ while leaning the joining boundary lines to the arrow direction to form the rubber strip layer $1_5$. With such structure, the leaning directions of the joining boundary lines of the rubber strip of the rubber strip layer forming the tread surface become reverse to each other on both the sides of the main groove 7. Accordingly, in the same way as shown in FIG. 12, the product external appearance defect is hard to occur, and the occurrence and growth of a crack can be prevented.

EXAMPLE (1) Regarding the Off-the Road tire having a size of 23.5R25 and the lug pattern shown in FIG. 7 (Example 1, Prior art 1), the occurrence rate of the product external appearance defect (%) after the tire being processed in the manufacturing process for a specified period of time was evaluated in the following manner. The evaluation result is shown in Table 1. Herein, Example 1 is a tire having a tread formed from a rubber strip which is wound in such a manner as shown in FIG. 5. And, Prior art 1 is a tire having a tread formed from a rubber strip which is wound in such a manner as shown in FIG. 4.

The Occurrence Rate of the Product External Appearance Defect (%)

The string-like shortage of the rubber flowing occurred on the tread surface due to the residual air on the concave portions on the surface of the rubber strip layer. Regarding the external appearance defect as described above, the occurrence rate of the defect according to the difference in the manner of winding the rubber strip is summarized in Table 1.

TABLE 1

|  | Occurrence rate (%) | Number of vulcanized tires |
| --- | --- | --- |
| Example 1 | 0.4 | 250 |
| Prior art 1 | 14.5 | 55 |

As apparent from Table 1, the occurrence rate of the product external appearance defect of Example 1 is extremely low as compared with that of Prior art 1.

(2) Regarding the Off-the Road tire having a size of 23.5R25 and the block pattern shown in FIG. 8 (Example 2, Comparative example 1, Prior art 2), the occurrence rate of the product external appearance defect (%) after the tire being processed in the manufacturing process for a specified period of time was evaluated in the same manner as that in the foregoing (1). The evaluation result is shown in Table 2. Herein, Example 2 is a tire having a tread formed from a rubber strip which is wound in such a manner as shown in FIG. 14. And, Comparative example 1 is a tire having a tread formed from a rubber strip which is wound in such a manner as shown in FIG. 13. Moreover, Prior art 2 is a tire having a tread formed from a rubber strip which is wound in such a manner as shown in FIG. 4.

TABLE 2

|  | Occurrence rate (%) | Number of vulcanized tires |
| --- | --- | --- |
| Example 2 | 0.1 | 1,250 |
| Comparative example 1 | 2.7 | 75 |
| Prior art 2 | 7.1 | 350 |

As apparent from Table 2, the occurrence rate of the product external appearance defect of Example 2 is low as compared with those of Comparative example 1 and Prior art 2.

(3) Regarding the Off-the Road tire having a size of 23.5R25 and the lug pattern shown in FIG. 7 (Example 3, Prior art 3), a rotating drum test was performed under the following conditions. Thus, the occurrence of a crack on the tread and the extent thereof were investigated when the tire was tested by making it travel on the rotating drum for a regulated time. The investigation result is shown in Table 3.

Herein, Example 3 is a tire having a tread formed from a rubber strip which is wound in such a manner as shown in FIG. 5. And, Prior art 3 is a tire having a tread formed from a rubber strip which is wound in such a manner as shown in FIG. 4. p1 Rim: 25×19.50 (2.5)

Air pressure: 500 kPa

Test load: 143 KN (120% of that specified in JATMA standard 1998)

On the circumference of the rotating drum, two cleats (protrusions) having semi-circular cross sections with a radius of 60 mm are mounted. Thus, an impact force is continuously applied to the tread surface of the tire.

Speed: 8 km/h

TABLE 3

|  | Example 3 | Prior art 3 |
| --- | --- | --- |
| Traveling for 240 hrs. | No occurrence of crack | Occurrence of crack in vicinity of shoulder |
| Traveling for 480 hrs. | No occurrence of crack | Occurrence of crack in vicinity of shoulder developed to tread breakage. No occurrence of crack on tread center. |

As apparent from Table 3, a crack did not occur in Example 3, while a crack occurred in Prior art 3.

(4) Regarding the Off-the Road tire having a size of 23.5R25 and the block pattern shown in FIG. 8 (Example 4, Comparative example 2, Prior art 4), a rotating drum test is performed under the following conditions. Thus, the occurrence of a crack on the tread and the extent thereof were investigated when the tire was tested by making it travel on the rotating drum for a regulated time. The investigation result is shown in Table 4.

Herein, Example 4 is a tire having a tread formed from a rubber strip which is wound in such a manner as shown in FIG. 14. And, Comparative example 2 is a tire having a tread formed from a rubber strip which is wound in such a manner as shown in FIG. 13. Moreover, Prior art 4 is a tire having a tread formed from a rubber strip which is wound in such a manner as shown in FIG. 4.

Rim: 25×19.50 (2.5)
Air pressure: 500 kPa
Test load: 143 KN (120% of JATMA standard 1998)
On the circumference of the rotating drum, two cleats (protrusions) having semi-circular cross sections with a radius of 60 mm are mounted. Thus, an impact force is continuously applied to the tread surface of the tire.
Speed: 8 km/h

TABLE 4

|  | Example 4 | Comparative example 2 | Prior art 4 |
| --- | --- | --- | --- |
| Traveling for 240 hrs. | No occurrence of crack | No occurrence of crack on shoulder block. Occurrence of crack on center block. | Occurrence of crack on both shoulder block and center block. |
| Traveling for 480 hrs. | No occurrence of crack | No occurrence of crack on shoulder block. Occurrence of crack on center block developed into belt. | Occurrence of crack on shoulder block developed to tread breakage. Occurrence of crack on center block developed into belt. |

As apparent from Table 4, a crack did not occur in Example 4, while a crack occurred in Comparative example 2 and Prior art 4.

As described above, in the pneumatic radial tire according to the present invention, the joining boundary lines of the rubber strip of the rubber strip-stacked body forming at least the outermost layers of the both shoulder portions are respectively leaned toward the outside of the tire diameter direction relative to the tire outside direction of the tire width direction. Thus, separation from the tread surface, which is caused by the occurrence of a crack during running, can be prevented. Moreover, the manufacturing defect can be eliminated in the vulcanization process.

Although the preferred embodiment of the present invention has been described in detail, it should be understood that various changes, substitutions and alternations can be made therein without departing from spirit and scope of the inventions as defined by the appended claims.

What is claimed is:

1. A pneumatic radial tire having a carcass layer laid between a pair of bead portions and a tread composed of a stacked body of a rubber strip wound continuously and spirally in a tire circumferential direction on the outside of the carcass layer through a belt layer, and having a plurality of main grooves, which extend in a tire circumferential direction, provided on the surface of the tread, wherein boundary surfaces of the rubber strip of the rubber strip-stacked body are leaned toward the outside of a tire diameter direction relative to a tire outside direction in a tire width direction, in outermost regions from a pair of main grooves of an outermost side of a tire width direction to corresponding tread shoulder ends thereto, at least in the groove wall portion of the main groove closer to the tread shoulder ends, and boundary surfaces of the rubber strip of the rubber strip-stacked body are leaned toward the inside of the tire diameter direction relative to the tire outside direction in the tire width direction, in the outermost regions from said main grooves of the outermost side to a tread center.

* * * * *